Oct. 8, 1957        F. R. McDERMOTT        2,809,145
VIBRATION-ABSORBING PAD AND PROCESS OF MANUFACTURE
Filed Jan. 18, 1955        2 Sheets-Sheet 1
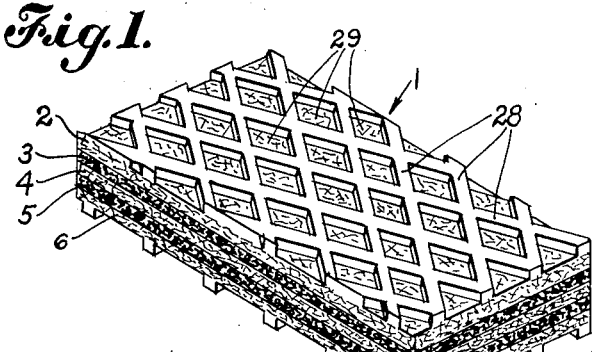
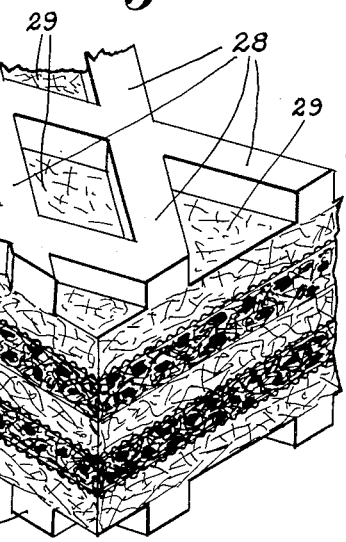
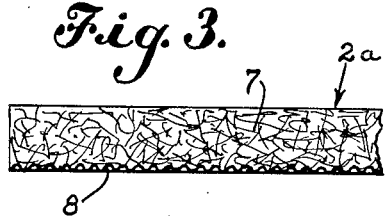
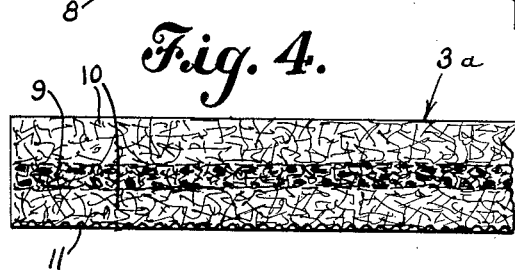
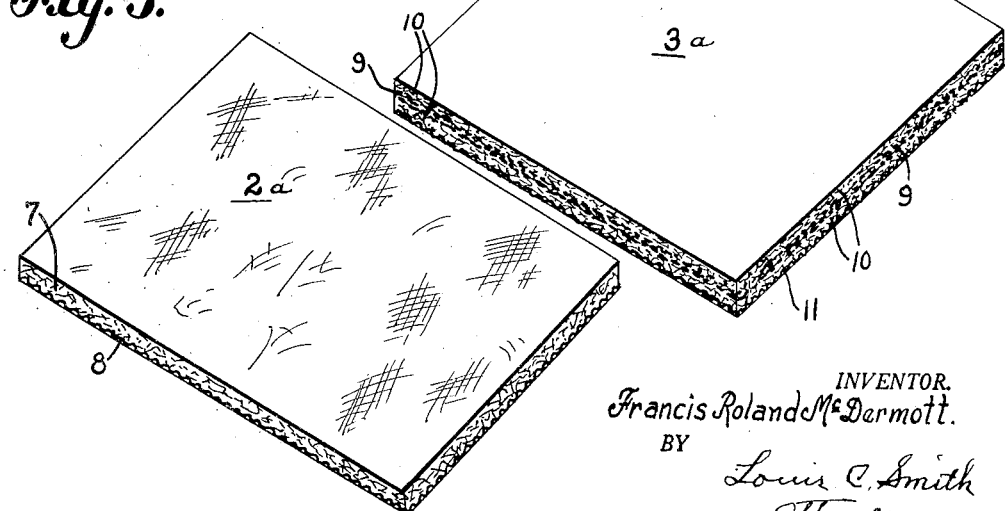
INVENTOR.
Francis Roland McDermott.
BY
Louis C. Smith
Attorney.

Oct. 8, 1957  F. R. McDERMOTT  2,809,145
VIBRATION-ABSORBING PAD AND PROCESS OF MANUFACTURE
Filed Jan. 18, 1955  2 Sheets-Sheet 2
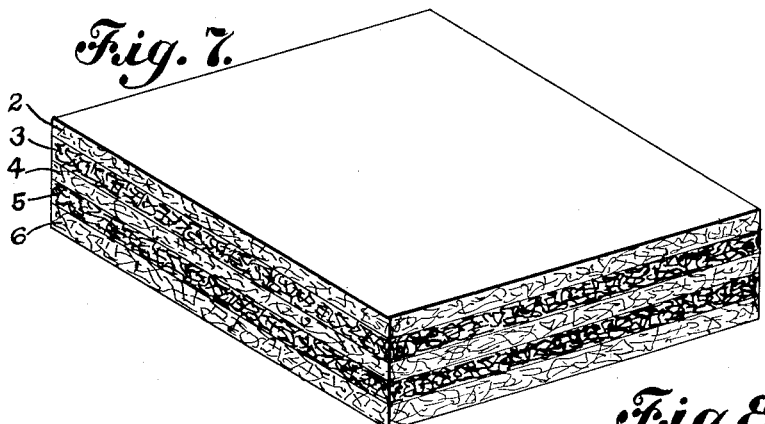
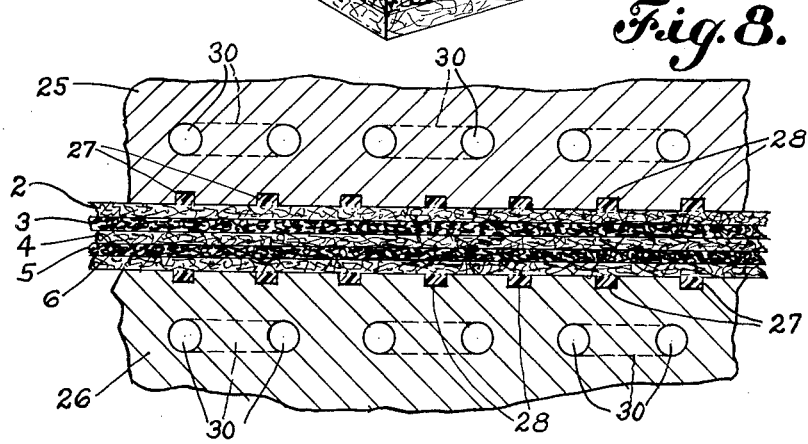
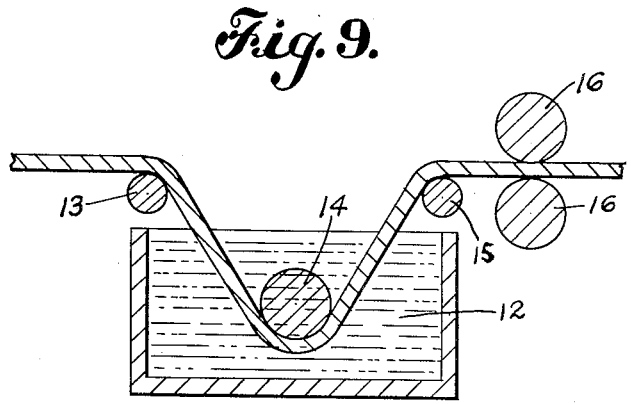
INVENTOR.
Francis Roland McDermott,
BY
Louis C. Smith
Attorney.

United States Patent Office 2,809,145
Patented Oct. 8, 1957

2,809,145

VIBRATION-ABSORBING PAD AND PROCESS OF MANUFACTURE

Francis Roland McDermott, Franklin, Mass.

Application January 18, 1955, Serial No. 482,442

3 Claims. (Cl. 154—106)

This invention relates to vibration-absorbing pads such as are used for supporting machinery which is subject to vibration, the purpose of the pads being to absorb the vibration and prevent it from being transmitted to the floor of the building on which the machine is supported.

Such vibration-absorbing pads are usually placed beneath the legs or pedestals of the machine in question.

When an vibration-absorbing pad is in use, each vibration of the machine supported by the pad exerts a compressive force on the pad, and the value of the pad as an absorber of vibrations depends partly on its ability to recover quickly from each of the succession of compressive forces generated by the vibration of the machine, and partly on the completeness of such recovery, the more complete the recovery the longer will be the useful life of the pad.

One of the objects of the present invention is to provide an vibration-absorbing pad which is tough, and wear resistant, which has excellent vibration absorbing characteristics, and which has a long useful life.

Another object of the invention is to provide an vibration-absorbing pad which when performing its duty of absorbing vibrations has a non-creeping characteristic, and which will cling tenaciously to and retain its position on its supporting floor without being bolted or otherwise fastened thereto.

An advantage of using an vibration-absorbing pad having this non-creeping characteristic is that it facilitates the mounting of a machine upon such pads as the operation of bolting or securing the pads to the floor is dispensed with, and it also facilitates the moving of such a machine from one position to another because such moving operation involves simply lifting the machine off the pads supporting it, picking up the pads from the floor, placing them in the new location, and then replacing the machine on the pads, the work of unbolting the pads from the floor before the moving operation and then securing them to the floor after the operation being dispensed with.

Other objects of the invention are to provide improvements in vibration-absorbing pads which will be more fully hereinafter set forth and pointed out in the claims.

My improved vibration-absorbing pad is made of needled fabric, the body of which is preferably composed largely of sisal fibres, which fabric is impregnated with a vinyl plastic composition.

It is preferred to make the complete pad in laminated form, each lamination being a separate vinyl impregnated needled fabric. Some of the laminations are in the nature of plain needled fabric comprising a body of unspun fibres (preferably sisal fibres) which are needled to a backing fabric, and other laminations are composed of a similar needled fabric except that the center portion thereof has granulated cork mixed with the fibres. Where these two types of needled fabric are used, I will preferably assemble the said types in alternate arrangement. In making a pad, the several laminations of vinyl impregnated needled fabric are assembled in superposed relation and the assembled laminations are then subjected to pressure between heated dies which serve not only to compress the needled fabric of the laminations to the desired density but also to subject the vinyl plastic composition to a heat treatment by which it is brought into a condition in which when it is cooled it has the desired resilient characteristics. During this compressing operation the laminations become firmly bonded together.

The pad is made with raised ribs on at least one face thereof, such ribs being composed almost entirely of the vinyl plastic composition and being substantially free from the fibrous constituents of the pad.

In the drawings, wherein I have illustrated a selected embodiment of the invention:

Fig. 1 is a perspective view of an vibration-absorbing pad made in accordance with the invention;

Fig. 2 is an enlarged fragmentary perspective view of a portion of the pad shown in Fig. 1;

Fig. 3 is a view illustrating one of the laminations of the pad which is in the form of a plain needled fabric;

Fig. 4 illustrates another lamination of the pad which has the core of finely ground cork;

Fig. 5 is a perspective view of a complete lamination of a pad having the construction shown in Fig. 3;

Fig. 6 is a similar perspective view of a lamination having the construction shown in Fig. 4;

Fig. 7 is a perspective view illustrating a plurality of vinyl impregnated laminations in superposed relation and before they are compressed and cured;

Fig. 8 is a fragmentary view illustrating the operation of compressing the laminations to make an integral pad;

Fig. 9 is an illustrative view showing the operation of impregnating the needled fabric with the vinyl plastic composition.

A vibration-absorbing pad embodying the invention is shown at 1 in Fig. 1 and it is formed of a plurality of layers or laminations of vinyl impregnated needled fabric. The pad may be made with any desired number of laminations, depending upon how thick the pad is to be and what weight it is to support. In the illustrated embodiment, the pad is shown as having five layers or laminations indicated at 2, 3, 4, 5, and 6 respectively. As stated above, some of the laminations are plain needled fabric consisting of a body of unspun fibres needled to a backing of textile fabric, and other laminations have a center core of finely ground cork.

In Fig. 3 which shows a lamination of plain needled fabric 2a, 7 indicates the body of sisal fibres, and 8 the textile backing to which the fibres are needled, this operation being performed by any ordinary needle loom.

A lamination made from a cork filled needled fabric as shown at 3a in Fig. 4 in which 9 indicates the cork filling which is located within the body of the fibre constituent 10, and the body of fibre having its cork filling may or may not be needled to a backing fabric such as shown at 11, it being understood that the sisal fibre portion of the layer or lamination will be subject to the operation of a needle loom to interlace the fibres with each other.

The cork filled needled fabric used in producing the lamination 3a shown in Fig. 4 may be made in accordance with the teaching of my Patent #2,635,322, dated April 21, 1953.

Each type of needled fabric above referred to will normally come from the needle loom in the form of a long web, and such webs are cut into sections of various sizes according to the size of the pads to be made. Fig. 5 illustrates a section cut from a plain needled fabric 2a such as shown in Fig. 3, and Fig. 6 illustrates a similar section cut from a cork filled needled fabric 3a such as shown in Fig. 4.

Before the sections are assembled in the form of a pad they are impregnated with a vinyl plastic composition, and this impregnating operation can be accomplished either on the webs as they come from the needle loom and before they are cut into sections, or the separate sections may be impregnated after they have been cut from the web.

The impregnation operation is illustrated in Fig. 9 wherein 12 indicates a bath of the vinyl plastic composition through which the web of needled fabric or each section thereof is passed. The device shown in Fig. 9 includes a guide roll 13 over which the fabric passes into the bath 12, a hold down roll 14 submerged in the bath and under which the fabric passes, a second guide roll 15 over which the fabric passes as it emerges from the bath, and squeeze rolls 16 by which surplus vinyl plastic material is squeezed out of the fabric.

The various sections or laminations for each pad are assembled in pad form, as shown in Fig. 7, while the vinyl plastic compositon is still wet and after the layers have thus been assembled in pad form, the pad is subjected to pressure for the purpose of compacting the needled fabric of the various laminations, and is also subjected to heat to reduce the vinyl plastic composition to the desired consistency. This compressing and heating of the pad may be accomplished by placing the assembled impregnated layers between a pair of compressing dies 25, 26 which have provision for controlling the temperature thereof, and then subjecting the pad to the necessary high pressure to produce a pad of the desired density and heating the dies sufficiently to give the vinyl plastic composition the desired heat treatment.

As illustrated in Fig. 8, the dies 25, 26 are formed with passages 30 through which a temperature controlling medium may be forced for giving the dies the desired temperature at various stages of the operation.

In the manufacture of articles from a vinyl plastic composition it is a well known and common practice to cool the composition after it has been reduced to a proper condition by the heat treatment, thereby to stabilize such composition in the condition which it is to have permanently. In the construction shown the dies may be heated by forcing a heated medium through the passages 30 and the desired cooling effect may be obtained by forcing a cooling medium through said passages.

During the compressing operation the various layers or laminations 2, 3, 4, 5, and 6 become bonded together by the vinyl plastic composition with the result that the assembled laminations become integrally united.

One or both of the compressing dies 25, 26 may be formed in its face with grooves 27, and such grooves may have any desirable arrangement. During the operation of compressing the pad by the dies some of the vinyl plastic composition will be forced from the fibres into the grooves 27, and thereby the pad when removed from the compressing dies will be provided on one or both faces with ribs 28 which are composed largely of the vinyl plastic composition and which are relatively free from the fibre constituent.

In the construction shown, the grooves 27 are arranged in parallel rows having a crossing relation, thereby producing the diamond shape pattern of ribs 28 shown in Fig. 1. This arrangement of surface ribs or raised portions composed principally of the vinyl plastic composition is an important factor in giving the pad its non-creeping characteristic. The formation of these ribs 28 in the pattern shown provides the surface of the pad with a series of separate depressed portions 29, and when the pad is supporting a weight such as the weight of a machine, the ribs 28 yield slightly thus forcing the air out of the depressed areas so that in effect the under surface of the pad which rests on the floor has somewhat the nature of a plurality of suction cups, which is an important factor in providing the non-creeping characteristic.

Any suitable vinyl plastic material may be used such as vinyl chloride or copolymers of vinyl chloride and vinyl acetate, and the vinyl plastic composition can be obtained by grinding the vinyl constituent, which is in the form of a powder, in a suitable plasticizing oil, thereby to produce a vinyl composition having a desired flowable consistency, and if desired a certain percentage of clay may be mixed in the composition.

The amount of oil used may vary, but good results have been obtained by using about equal quantities of the vinyl product and the plasticizing oil, although the proportion of oil used may be reduced more or less depending somewhat on the characteristic which it is desired the pad should have.

The number of laminations which are incorporated in a pad embodying my invention may be varied depending upon the use to which the pad is to be put. Also, the arrangement of the laminations may be varied more or less, although it is preferred that the plain needled fabric laminations and the cork filled laminations should alternate in the pad structure. In the drawings, which show a pad having five laminations, the laminations 2, 4, and 6 are made of the plain needled fabric 2a without the cork filling such as shown in Fig. 3, and the other two laminations indicated at 3 and 5 are the cork filled laminations 3a such as shown in Fig. 4.

When a mass of vinyl product is distorted by application of force, said mass will tend to return to its original shape or contour after the distorting force has been removed, even though it was held in its distorted shape for a long period of time. This characteristics is sometimes referred to as the "memory" characteristic of the vinyl product and is the result of its chemical composition.

The body portion of a needled fabric composed of sisal fibres is also resilient and will yield when pressure is applied to it, but will tend to resume its normal shape when the pressure is removed, this being the result of the physical composition of the sisal fibres.

I have discovered that in a pad made up of sisal fibres impregnated with a vinyl plastic composition as above described, the memory characteristic of the vinyl product is disciplined by the presence of the sisal fibres, thereby to produce a pad which has superior vibration absorbing qualities.

I claim:

1. A vibration-absorbing pad for supporting heavy machines and absorbing vibrations developed therein, said pad having a laminated structure, each lamination being a highly compressed needled fabric having a uniform density and made from unspun fibrous material, which fabric is completely impregnated with a vinyl plastic composition in solid form and which is permanently resilient and retains a vibration-absorbing characteristic when subjected to high pressure, said laminations being bonded together by said vinyl plastic composition, and one face at least of the pad having raised portions of substantial thickness which consist of said resilient vinyl plastic composition in solid form which is substantially free from said fibrous material.

2. A vibration-absorbing pad for supporting heavy machines and absorbing vibrations developed therein, said pad having a laminated structure, each lamination being a highly compressed needled fabric having a uniform density and made from unspun sisal fibres, which fabric is completely impregnated with vinyl plastic composition in solid form and which is permanently resilient and retains a vibration-absorbing characteristic when subjected to high pressure, one at least of said laminations containing ground cork, said laminations being bonded together by said vinyl plastic composition and one face at least of the pad having raised ribs of substantial thickness and which cross each other, said ribs being of said resilient vinyl plastic composition in solid form which is substantially free from the sisal fibres.

3. The process of making a laminated vibration-absorbing pad for supporting heavy machinery and absorbing vibrations developed therein, which process consists in superposing laminations of needled fabric, each of which laminations is composed of sisal fibres and is completely impregnated with a vinyl plastic composition, subjecting the superposed laminations to high pressure between pressure dies, one at least of which dies has grooves in its pressure face, whereby the laminations are highly compressed together and some of the vinyl plastic ingredient in the laminations is forced into and fills the grooves, thereby producing on at least one face of the pad raised ribs of the vinyl plastic composition, each of which ribs is of substantial thickness and substantially free from the sisal fibre, subjecting the dies to temperature change thereby to reduce the vinyl plastic composition to a solid state with a permanent vibration-absorbing resiliency that is effective in absorbing vibrations generated by a heavy machine that is being supported on said pad.

References Cited in the file of this patent

UNITED STATES PATENTS

| | | |
|---|---|---|
| 2,249,888 | Dodge | July 22, 1941 |
| 2,314,162 | Reinhardt | Mar. 16, 1943 |
| 2,372,433 | Koon | Mar. 27, 1945 |
| 2,373,033 | Kopplin | Apr. 3, 1945 |
| 2,409,645 | Sawyer | Oct. 22, 1946 |
| 2,444,396 | Collins et al. | June 29, 1948 |
| 2,450,435 | McGillicuddy | Oct. 5, 1948 |
| 2,585,108 | Gordon | Feb. 12, 1952 |
| 2,635,322 | McDermott | Apr. 21, 1953 |
| 2,669,527 | Horwich | Feb. 16, 1954 |
| 2,713,016 | Weiss | July 12, 1955 |